March 18, 1958     S. H. SPENCER     2,827,312

PNEUMATIC COUPLER HAVING RADIALLY MOVEABLE LOCKING MEANS

Filed April 26, 1956

SIDNEY H. SPENCER
INVENTOR

BY

ATTORNEYS

United States Patent Office 2,827,312
Patented Mar. 18, 1958

2,827,312

PNEUMATIC COUPLER HAVING RADIALLY MOVEABLE LOCKING MEANS

Sidney H. Spencer, Washington Grove, Md., assignor to the United States of America as represented by the Secretary of the Navy Application April 26, 1956, Serial No. 580,966

7 Claims. (Cl. 285—18)

The present invention relates to couplers. More specifically, the present invention relates to a coupler for conduit or similar structures which is capable of securing two tubular members together by the application of compressed air to one of the components of said coupler.

The present invention finds particular application in temporarily coupling two tubular members to form a joint capable of withstanding bending and axial tensile or compressive forces. Prior connectors having locking properties similar to those of the present invention are not adapted for rapid engagement or disengagement. As an example, the well known threaded coupler is extremely unmanageable when it is desired to secure tubular members of relatively large dimensions, say of the order of three feet in diameter, and ten feet in length. Moreover, if the sections to be fitted are of appreciable weight, coupling cannot be accomplished without special equipment. Friction couplers possess similar disadvantages, the greatest being the difficulties encountered in attempting to release a secure friction coupling.

It is therefore an object of the present invention to provide a coupler for releasably engaging a pair of tubular members.

Another object of the present invention is the provision of a coupler adapted for the convenient engagement of tubular members having large cross sectional dimensions.

Still another object of the present invention is the provision of a coupler adapted to engage tubular members without the requirement of burdensome manipulation of said members.

Other objects and many of the attendant advantages of this invention will be readily appreciated as the same becomes better understood by reference to the following detailed description when considered in connection with the accompanying drawings.

Briefly, the present invention comprises a tubular male section provided with a series of circumferentially arranged flexible tongues adapted to be expanded by a pneumatic tube. Upon expansion, locking rings carried by the tongues engage locking rings carried within a grooved female tubular section.

Figure 1:
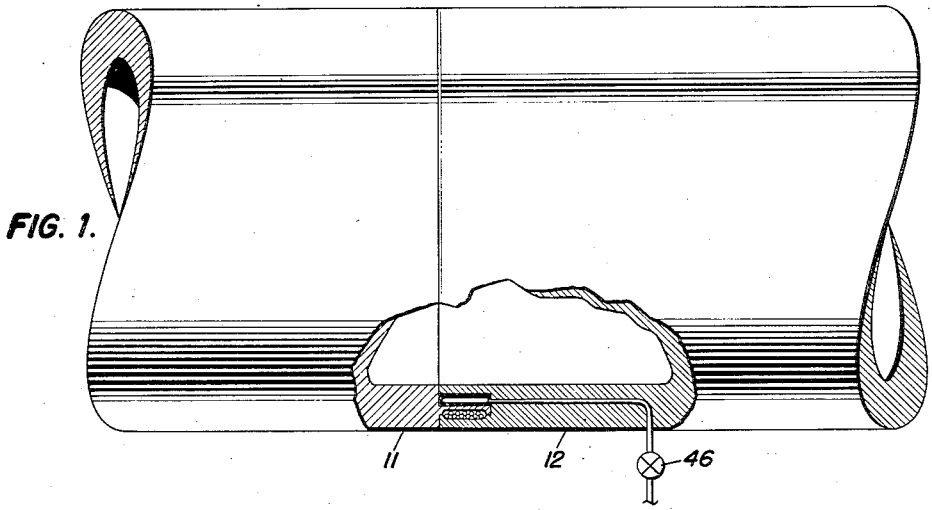
Fig. 1 is an elevation of a large tubular member with portions thereof broken away to reveal in section the coupler of the present invention.
Figure 2:
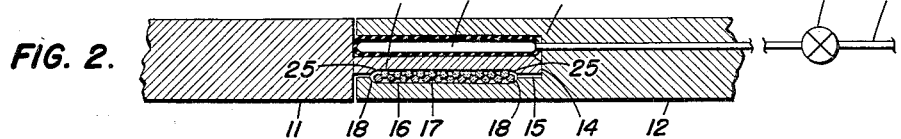
Fig. 2 is an enlarged detail view, in section, of the coupler shown in Fig. 1.

In Fig. 1, a male tubular member 11 is shown joined to a female tubular member 12, in accordance with the present invention. Referring now to Fig. 2, the walls of the female tubular section 12 are provided with a groove 13 extending circumferentially of said section to receive flexible tongues 14 carried by the male counterpart 11. The outermost wall 15 of the groove 13 is further provided with a recess 16 extending the length of the wall wherein locking rings 17 are secured. The rings 17 are formed by bending a wire having a length slightly less than the circumference of the recess 16 about a radius slightly greater than the axial radius of the recess 16. The rings 17 may be compressed for insertion into the recess 16 and upon release will expand to securely engage the wall of the recess. Sufficient rings are provided to fill the recess so that movement of the rings along the longitudinal axis of the tubing is prevented by the abutment of the rings against the shoulders 18 which mark the edges of the recess 16.

Figure 3:
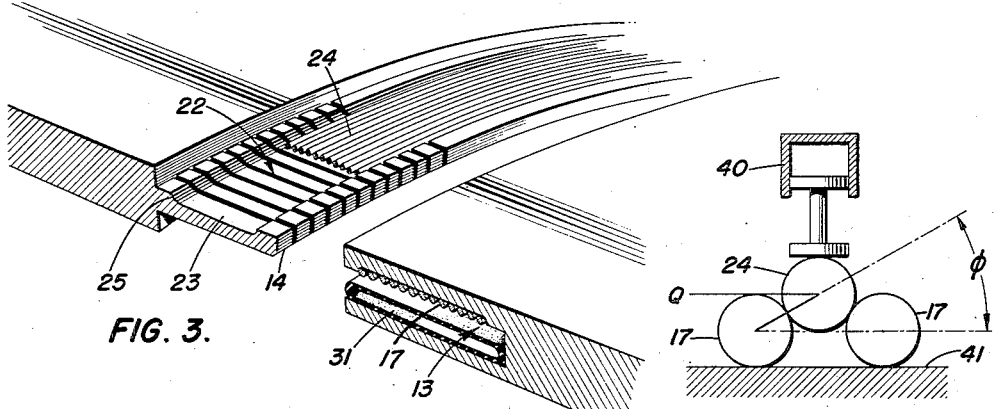
Fig. 3 is an enlarged detail perspective view of the coupler of the present invention.

In Figs. 2 and 3, it can be seen that the tongues 14 carried by the tubular section 11 slidably fit within the groove 13. A circumferential recess 22 is provided in the outermost surfaces 23 of the tongues 14 for the purpose of receiving rings 24 in like manner to the recess 16. The rings 24 are formed of wire which has been bent about a radius slightly smaller than the axial radius of the recess 22. The rings 24 are expanded and slipped over the tongues 14 so that upon release, the rings 24 will grip the tongues and be carried along with them. In addition, the slight prestressing of the rings exerts a compressive force upon the tongues 14 so as to render the tongues more readily insertible into the groove 13. As in the case of the rings 17, sufficient rings 24 are provided to fill the recess 22, their axial movement being prevented by the shoulders 25 of said recess.

The centers of the rings 24 are displaced axially from the centers of the rings 17 so that upon expansion of the tongues 14, a portion of each of the rings 24 partially occupies the space between adjacent rings 17. A circular pneumatic tube 31 occupies a portion of the groove 13, and bears upon the innermost surfaces of the groove 13 and tongues 14. Upon inflation, tube 31 expands to exert a locking force upon the tongues 14. The tube 31 is preferably flat-sided in cross section when deflated to permit easy insertion into the groove 13 and to present a maximum bearing surface upon the surfaces of the groove 13 and tongues 14 when inflated.

Figure 5:
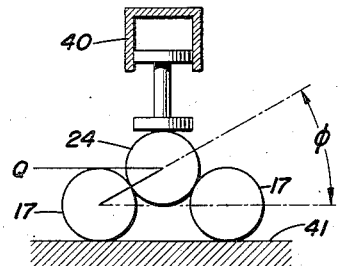
Fig. 5 is an analogue of the coupler showing the locking forces available therein.

In Fig. 5, a simple analogue of the present coupler is presented. The pneumatic tube 31 is replaced by a piston 40 having a cross sectional area, A, and bearing upon a ring 24. The ring 24 is tangent to two adjacent rings 17 resting on a rigid surface 41 which represents the bearing surface of the recess 16. It can be seen that a force Q applied to the ring 24 tending to separate the coupling also tends to compress the air, initially at a pressure $P_{0_1}$ contained within the cylinder. A simple calculation reveals that Q must exceed $$\frac{P_0 A}{\tan \phi}$$

before axial movement of the coupling can occur.

One result obtained by consideration of the analogue of Fig. 5 is that smaller angles of $\phi$ increase the available locking forces.

Figure 4:
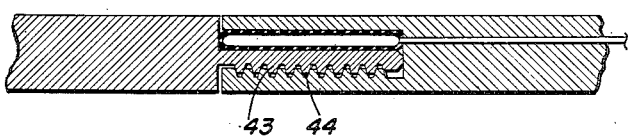
Fig. 4 is a view showing a modification of the coupler of the present invention.

Another means for increasing the locking forces is to replace the rings 17 and 24 with ribs and grooves cut in the surface of the members 11 and 12. Fig. 4 illustrates such a modification. In this view the rings 24 are replaced by ribs 43. Similarly, the rings 17 are replaced by grooves 44 extending around the circumference of the outermost wall of groove 13.

In use, it is merely necessary to insert the male tubular member 11 into the female tubular member 12 and inflate the pneumatic tube 31 by the application of compressed air to the valve stem 45 (Fig. 2). A suitable check valve 46 is carried within the valve stem 45 to maintain pressure within the tube 31 and to permit the relief of pressure for subsequent detachment of the coupled members. The female member is hoop loaded, thereby rendering the female portion of the coupling relatively rigid and inflexible. The tongues are therefore considerably more flexible than the female member, hence inflation of the tube moves the tongues, and the locking rings carried by the tongues, into firm engagement with the locking rings carried by the female member. Upon deflation of the pneumatic tube, the flexible tongues resiliently return to a position which permits detachment to be readily accomplished.

Obviously many modifications and variations of the present invention are possible in the light of the above teachings. It is therefore to be understood that within the scope of the appended claims the invention may be practiced otherwise than as specifically described.

What is claimed is:

1. A detachable coupling for joining two tubular members, comprising, an annular series of flexible tongues carried by one of said members, the other of said members having a groove to receive said tongues, a plurality of locking members carried by said tongues, means in the groove for cooperating with said locking members and inflatable means for moving said tongues, locking members, and cooperating means into locking engagement.

2. A coupling as claimed in claim 1, wherein said inflatable means includes a pneumatic tube.

3. A coupling as claimed in claim 1, wherein said locking members carried by said tongues include a plurality of annular rings.

4. A coupling as claimed in claim 1, wherein said locking members carried by said tongues include a plurality of annular ribs.

5. A coupling as claimed in claim 1, wherein said cooperating means in said groove includes a plurality of second locking members for engaging said first locking members on said tongues.

6. A coupling as claimed in claim 5, wherein said second locking members carried in said groove include a plurality of annular rings.

7. A coupling as claimed in claim 5, wherein said second locking members carried in said groove include a plurality of annular ribs.

References Cited in the file of this patent
UNITED STATES PATENTS

| | | |
|---|---|---|
| 2,015,081 | McElhaney | Sept. 24, 1935 |
| 2,206,672 | Pederquist | July 2, 1940 |
| 2,523,716 | Parr | Sept. 26, 1950 |
| 2,715,532 | Gunther | Aug. 16, 1955 |
| 2,727,759 | Elliott | Dec. 20, 1955 |
| 2,756,075 | Rayner | July 24, 1956 |